US 10,328,815 B2

United States Patent
Hwang et al.

(10) Patent No.: US 10,328,815 B2
(45) Date of Patent: Jun. 25, 2019

(54) SUPPLEMENTARY BATTERY RECHARGING SYSTEM FOR VEHICLE AND METHOD OF CONTROLLING THE SAME

(71) Applicant: Hyundai Motor Company, Seoul (KR)

(72) Inventors: Hwan Hwang, Gyeonggi-do (KR); Dong Jun Shin, Gyeonggi-do (KR); Ho Joong Lee, Gyeonggi-do (KR); Jun Yeon Park, Gyeonggi-do (KR); Chang Ryeol Yoo, Incheon (KR)

(73) Assignee: Hyundai Motor Company, Seoul (KR)

( * ) Notice: Subject to any disclaimer, the term of this patent is extended or adjusted under 35 U.S.C. 154(b) by 308 days.

(21) Appl. No.: 15/219,406

(22) Filed: Jul. 26, 2016

(65) Prior Publication Data

US 2017/0166077 A1    Jun. 15, 2017

(30) Foreign Application Priority Data

Dec. 15, 2015 (KR) ........................ 10-2015-0178993

(51) Int. Cl.
| | | |
|---|---|---|
| *H02J 7/00* | (2006.01) | |
| *B60L 11/18* | (2006.01) | |
| *B60L 1/00* | (2006.01) | |
| *B60L 58/14* | (2019.01) | |
| *B60L 58/12* | (2019.01) | |
| *B60L 58/20* | (2019.01) | |
| *B60L 58/25* | (2019.01) | |
| *B60L 58/40* | (2019.01) | |

(52) U.S. Cl.
CPC ............. *B60L 11/1861* (2013.01); *B60L 1/00* (2013.01); *B60L 58/12* (2019.02); *B60L 58/14* (2019.02); *B60L 58/20* (2019.02); *B60L 58/25* (2019.02); *B60L 58/40* (2019.02); *H02J 7/007* (2013.01); *H02J 7/0054* (2013.01); *B60L 2210/12* (2013.01); *B60L 2240/545* (2013.01); *B60L 2240/547* (2013.01); *B60L 2240/80* (2013.01); *Y02T 10/7044* (2013.01); *Y02T 10/7066* (2013.01); *Y02T 10/7233* (2013.01); *Y02T 90/34* (2013.01)

(58) Field of Classification Search
CPC .................................................. B60L 11/1861
USPC ......................................................... 320/132
See application file for complete search history.

(56) References Cited

U.S. PATENT DOCUMENTS

2013/0175858 A1* 7/2013 Sakurai ............... B60L 11/1812
307/9.1
2013/0320923 A1   12/2013 Hooker et al.

FOREIGN PATENT DOCUMENTS

| JP | 2007-302129 A | 11/2007 |
| JP | 2010-141950 A | 6/2010 |
| KR | 10-1994-0017033 A | 7/1994 |

(Continued)

*Primary Examiner* — Edward Tso
*Assistant Examiner* — Ahmed H Omar
(74) *Attorney, Agent, or Firm* — Mintz Levin Cohn Ferris Glovsky and Popeo, P.C.; Peter F. Corless

(57) ABSTRACT

A method of efficiently recharging a supplementary battery of a vehicle can recharge the supplementary battery with power from a main battery. A method of controlling a supplementary battery recharging system includes: acquiring charged current of a supplementary battery; starting a timer when the charged current exceeds a limit range; updating a current limit on the basis of a timer value and temperature information of the supplementary battery; and controlling a target voltage using the updated current limit.

19 Claims, 6 Drawing Sheets

(56) References Cited

FOREIGN PATENT DOCUMENTS

| | | |
|---|---|---|
| KR | 10-1994-0017034 A | 7/1994 |
| KR | 10-2012-0101820 A | 9/2012 |
| KR | 10-2013-0109042 A | 10/2013 |
| KR | 10-2014-0014715 A | 2/2014 |
| KR | 2014-0082227 A | 7/2014 |
| KR | 2015-0052677 A | 5/2015 |

\* cited by examiner

-RELATED ART-

-RELATED ART-

SUPPLEMENTARY BATTERY RECHARGING SYSTEM FOR VEHICLE AND METHOD OF CONTROLLING THE SAME

CROSS-REFERENCE TO RELATED APPLICATION

This application claims under 35 U.S.C. § 119(a) the benefit of Korean Patent Application No. 10-2015-0178993, filed on Dec. 15, 2015, the entire contents of which are incorporated by reference herein.

BACKGROUND (a) Field of the Invention

The present invention relates to a method of efficiently recharging a supplementary battery of a vehicle, and more particularly, to a method that can recharge the supplementary battery with power from a main battery, and a recharging system for performing the same.

(b) Description of the Related Art

A vehicle is started using a battery voltage, and instruments such as indoor lamps and electrical devices such as an air conditioner of the vehicle are provided with power from a battery and a generator. When an engine of the vehicle is driven by rotating a starter motor to start the vehicle, an AC generator coupled to the engine through a fan belt generates electricity so as to recharge the battery.

In the case of an electric vehicle (EV) or a hybrid vehicle (PHEV/HEV), a motor thereof performs energy regeneration and torque supplement, and a main battery provides power. The main battery provides a high voltage (e.g., about 330V), in general. An electric car is provided with a supplementary battery in addition to the main battery. The supplementary battery provides power to operate an electrical switch for supplying a high voltage of the main battery to a motor control unit (MCU) or serves as a buffering device for voltage balancing in operations of devices driven by a low voltage (e.g. 12V) in the vehicle.

In particular, the main battery supplies power to the motor and devices in the vehicle, which are driven by electricity, after the vehicle is started. The supplementary battery provides power to operate an electrical switch for supplying a high voltage of the main battery to a motor control unit (MCU) or serves as a buffering device for voltage balancing in operations of devices driven by a low voltage (e.g. 12V) in the vehicle. The supplementary battery can be recharged by a low voltage DC-DC converter (LDC) that converts the voltage of the main battery to a low voltage. When the LDC recharges the supplementary battery, the output voltage of the LDC is controlled according to supplementary battery charging current. A supplementary battery charging logic will now be described with reference to FIGS. 1A-1B (RELATED ART).

FIGS. 1A and 1B illustrate an exemplary logic for controlling charging of a supplementary battery of a vehicle.

In FIGS. 1A and 1B, the charging control logic controls an LDC voltage by applying a current limit Batt Current Limit and a cancellation current limit Cancellation Batt Current Limit to current battery charged current Batt Current Filtered.

Referring to FIG. 1A, when a state that the current battery charged current Batt Current Filtered is greater than the current limit Batt Current Limit continues for a predetermined monitoring period (e.g. N=10 seconds), the LDC decreases the output voltage (i.e. target voltage) by 1 step (e.g. 0.1 V). The procedure is repeated at a monitoring interval.

When the current battery charged current Batt Current Filtered is lower than the Cancellation Batt Current Limit, as shown in FIG. 1B, voltage control is cancelled and thus the target voltage is set to a default LDC voltage. Here, the default LDC voltage may be fixed or controllable according to the state of the supplementary battery, for example, state of charge (SOC) and/or temperature of the supplementary battery.

When the logic as shown in FIGS. 1A and 1B is applied, charging current exceeds the current limit for a long time if recharging of the supplementary battery which has been discharged is started, and thus the target voltage is stepped down several times and a difference between the target voltage and the default LDC voltage increases. Here, battery charged current decreases upon completion of recharging of the supplementary battery and voltage control is canceled when the battery charged current is reduced below the cancellation current limit, and thus the target voltage stepped down several times is recovered to the default LDC voltage. When such situation is repeated, supplementary battery life is decreased.

SUMMARY

The present invention provides a recharging system and control method for efficiently recharging a supplementary battery of a vehicle, and in particular, for preventing repetition of abrupt change in a target voltage of a low voltage DC-DC converter (LDC) when the target voltage is controlled according to charging current.

A method of controlling a supplementary battery recharging system for a vehicle includes steps of: acquiring charged current of the supplementary battery; starting a timer when the charged current exceeds a limit range; updating a current limit on the basis of a timer value and temperature information of the supplementary battery; and controlling a target voltage using the updated current limit.

A non-transitory computer readable medium containing program instructions executed by a processor includes: program instructions that acquire charged current of a supplementary battery; program instructions that start a timer when the charged current exceeds a limit range; program instructions that update a current limit on the basis of a timer value and temperature information of the supplementary battery; and program instructions that control a target voltage using the updated current limit.

A supplementary battery recharging system for a vehicle includes: a supplementary battery; a low voltage DC-DC converter (LDC) for charging the supplementary battery with power of a main battery; a supplementary battery sensor for acquiring state information of the supplementary battery; and an LDC controller for acquiring charged current from the supplementary battery, starting a timer when the charged current exceeds a limit range, updating a current limit on the basis of a timer value and temperature information of the supplementary battery acquired from the supplementary battery sensor, and controlling a target voltage of the LDC using the updated current limit.

The present invention has the following advantages. Battery life can be increased since a target voltage change of the LDC is prevented from abruptly changing. Particularly, since a battery current limit is updated in consideration of charging time, a time required to recharge a discharged battery can be reduced.

The effects of the present invention are not limited to the above-described effects and other effects which are not described herein will become apparent to those skilled in the art from the following description.

DETAILED DESCRIPTION OF THE INVENTION

Figure 1A:
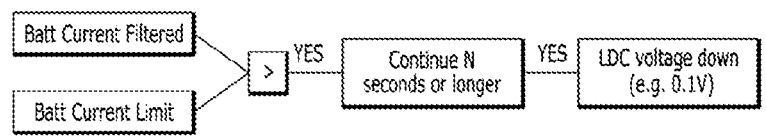
FIGS. 1A and 1B (RELATED ART) illustrate an exemplary logic for controlling recharging of a supplementary battery of a vehicle.
Figure 1B:
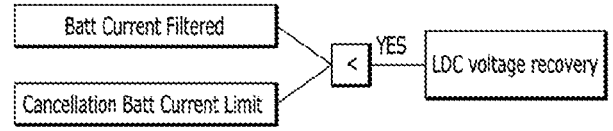

In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto. It should be understood that there is no intent to limit the invention to the particular forms disclosed herein. On the contrary, the invention is to cover all modifications, equivalents, and alternatives falling within the spirit and scope of the invention as defined by the claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

According to an embodiment of the present invention, a timer is operated when current battery charged current of a supplementary battery exceeds a predetermined range for a predetermined time or longer, a current limit is updated in consideration of duration of the timer and battery state, and a target voltage is periodically reduced when the current battery charged current is greater than the updated current limit.

Here, if the current battery charged current is not greater than the updated current limit, the target voltage can be reset to a reference target voltage.

When the current limit is updated, it is desirable that the current limit decrease as a timer value and battery temperature increase.

In addition, the current limit can be updated using a method of referring to a predetermined table on the basis of the timer value and battery temperature. Here, a plurality of tables may be provided according to an SOC range of the battery.

The timer can be reset when the current battery charged current is recovered within a predetermined range.

A recharging system which can perform the aforementioned supplementary battery recharging process according to an embodiment of the present invention is described herein.

Figure 2:
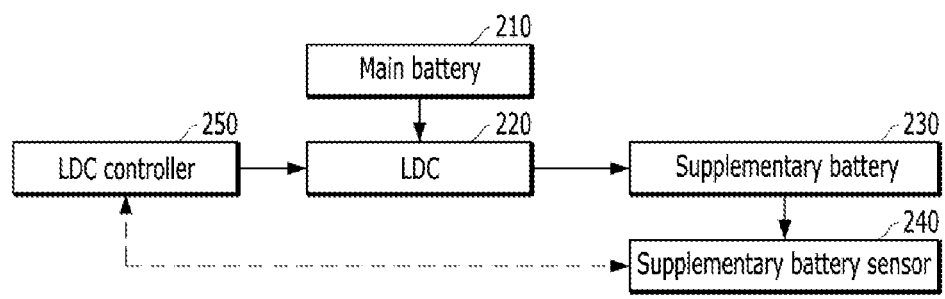
FIG. 2 is a block diagram illustrating an exemplary structure of a supplementary battery recharging system of a vehicle according to an embodiment of the present invention.

FIG. 2 is a block diagram illustrating an exemplary structure of a supplementary battery recharging system of a vehicle according to an embodiment of the present invention.

Referring to FIG. 2, the supplementary battery recharging system may include a main battery 210, a low voltage DC-DC converter (LDC) 220 for converting the output power of the main battery so as to recharge a supplementary battery 230, a supplementary battery sensor 240 for measuring a state of the supplementary battery, and an LDC controller 250 for controlling the LDC on the basis of battery state information measured by the supplementary battery sensor 240.

The supplementary battery sensor 240 may measure the voltage, charged current, temperature, and state of charge (SOC) of the supplementary battery.

The LDC controller 250 determines whether the charged current measured by the supplementary battery sensor 240 exceeds a limit range, starts a timer (or maintains operation of the timer if the timer is operating) when the charged current exceeds the limit range, and resets the timer when the charged current does not reach the limit range. Here, the LDC controller 250 repeatedly determines whether the charged current exceeds the limit range at a predetermined interval. Accordingly, the timer is set to 0 when the charged current is lower than the limit range, and the operation of the timer is maintained when the timer is operating and the charged current continuously exceeds the limit range.

The timer is managed as follows. When charged current exceeds the limit range, this means that the battery switches to a recharging mode after being discharged (charged current is a negative value when the battery is discharged). Accordingly, the timer is set 0 when the supplementary battery is discharged and operates upon switching of the supplementary battery to the recharging mode. In the table to be referred to when the current limit is updated, the current limit increases as a timer value decreases. Accordingly, upon start of recharging, the timer is set to a relatively small value and thus a high current limit is set, shortening battery recharging time. In the supplementary battery, a continuous charging time and charged current are important durability parameters which aid in rapid state recovery and durability maintenance of the supplementary battery.

The limit range compared with charged current is a value obtained by subtracting a predetermined constant from the current limit. The constant functions as a band of a predetermined region so as to prevent frequent timer reset. More specifically, the LDC 220 controls the current of the supplementary battery 230 by adjusting a target voltage of the supplementary battery 230, which is affected by various factors such as SOC and temperature of the battery. Since current variation is not uniform even under the same voltage control due to battery characteristics, the current limit is reduced by the band region when compared to charged current so as to prevent frequent timer reset which can occur due to a small current variation.

Figure 3:
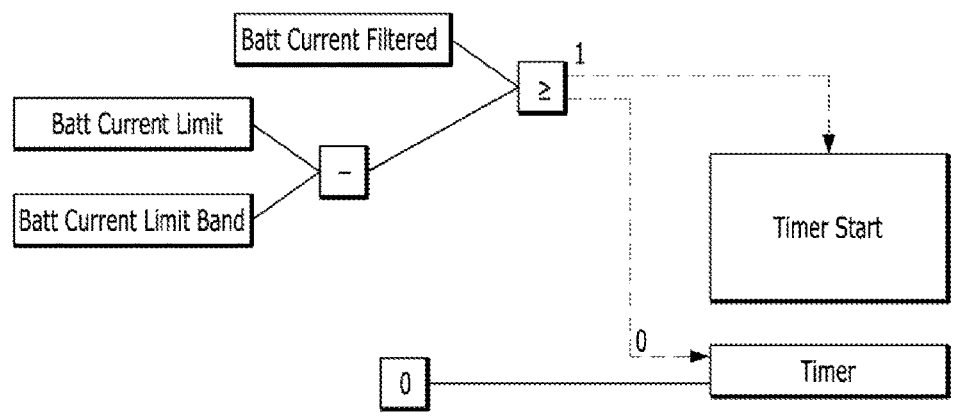
FIG. 3 illustrates an exemplary logic for managing a timer in the recharging system according to an embodiment of the present invention.

FIG. 3 illustrates an exemplary logic for managing the timer in the recharging system according to an embodiment of the present invention.

Referring to FIG. 3, the LDC controller acquires charged current Batt Current Filtered from the supplementary battery sensor and compares the acquired charged current with a value obtained by subtracting a band constant Batt Current Limit Band from a current limit Batt Current Limit. The LDC controller starts the timer (or maintains the operation of the timer if the timer is operating) when the charged current Batt Current Filtered is identical to or greater than the value and resets the timer to 0 otherwise.

As described above, the LDC controller updates the current limit on the basis of the timer value and BTM (battery thermal management) of the supplementary battery. Here, a table preconfigured according to timer values and BTM can be referred to. An example of such table is Table 1.

TABLE 1

| BTM (° C.) | Time(sec) | | | | |
|---|---|---|---|---|---|
| | 60 | 300 | 600 | 1200 | 3600 |
| −20 | 80 | 80 | 80 | 80 | 80 |
| 0 | 80 | 80 | 80 | 80 | 80 |
| 20 | 60 | 50 | 50 | 40 | 30 |
| 40 | 50 | 50 | 40 | 30 | 30 |
| 50 | 50 | 20 | 20 | 10 | 10 |

Referring to Table 1, the reference table can be configured such that the current limit decreases as time and BTM increase. Time intervals, temperature interval and current limit per interval in the table are exemplary and may be changed according to battery capacity or physical/chemical properties of the battery.

A plurality of reference tables may be provided according to SOC of the supplementary battery. A logic for updating the current limit using a plurality of SOCs is illustrated in FIG. 4.

Figure 4:
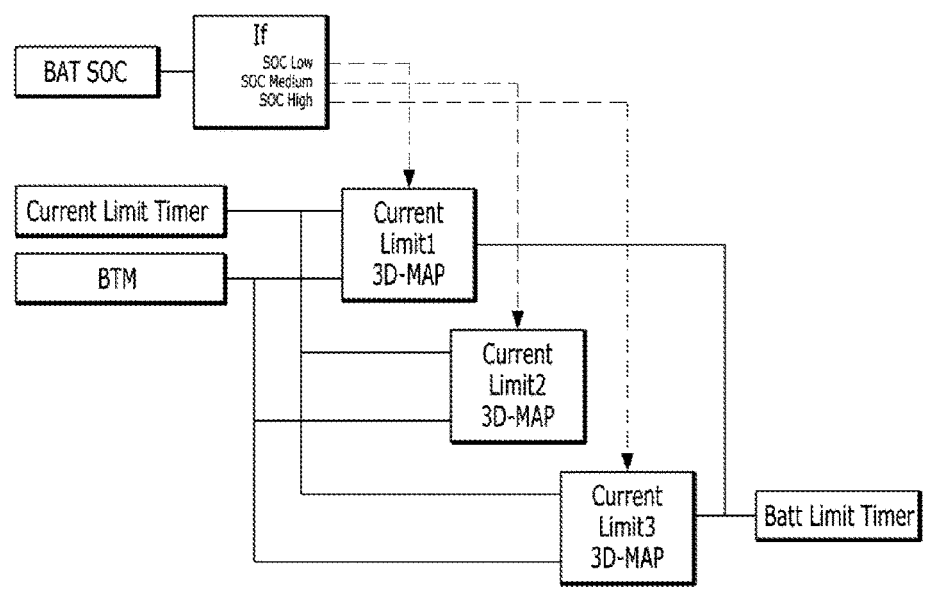
FIG. 4 illustrates an exemplary logic for updating a current limit in the recharging system according to an embodiment of the present invention.

FIG. 4 illustrates an exemplary logic for updating the current limit in the recharging system according to an embodiment of the present invention.

Referring to FIG. 4, the current limit can be updated on the basis of a timer value Current Limit Timer and BTM. Three tables 3D-MAP are provided according to battery SOC and a table corresponding to the current SOC can be referred to.

Upon update of the current limit, the output voltage of the LDC, that is, a target voltage, can be controlled on the basis of the updated current limit. This is described with reference to FIG. 5.

Figure 5:
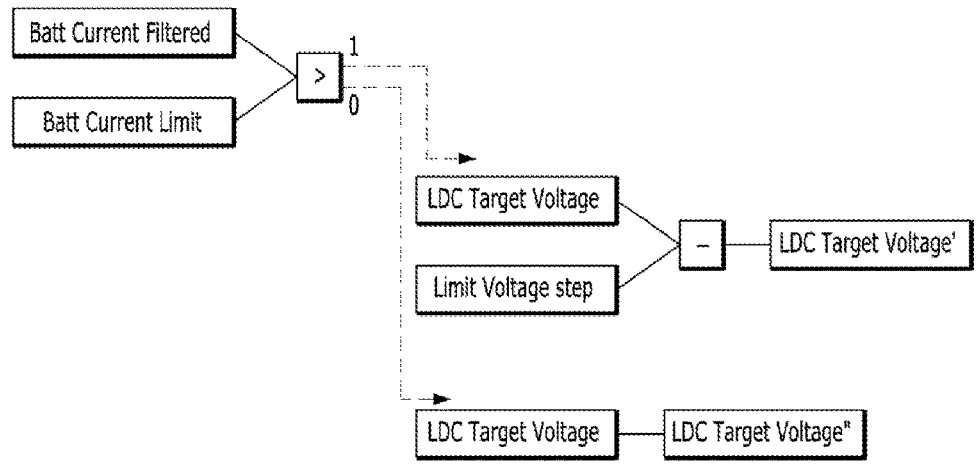
FIG. 5 illustrates an exemplary logic for controlling a target voltage using an updated current limit in the recharging system according to an embodiment of the present invention.

FIG. 5 illustrates an exemplary logic for controlling a target voltage using an updated current limit in the recharging system according to an embodiment of the present invention.

Referring to FIG. 5, when charged current Batt Current Filtered exceeds an updated current limit, the LDC controller sets the LDC output voltage to a controlled target voltage LDC Target Voltage' by subtracting a voltage corresponding to one limit voltage step from the current LDC target voltage. Conversely, when the charged current Batt Current Filtered does not exceed the updated current limit, the LDC controller sets the current LDC target voltage to a default target voltage LDC Target Voltage". Here, the logic is repeated at a predetermined interval. The controlled target voltage LDC Target Voltage' or the default target voltage LDC Target Voltage" are input to the logic as a current target voltage in the next interval.

While the logic shown in FIG. 5 may appear to be similar to a general voltage control logic, charging can be rapidly completed and voltage swing is minimized since the charged current of the battery is compared with the updated current limit.

The aforementioned logic is arranged as a flowchart and described with reference to FIG. 6.

Figure 6:
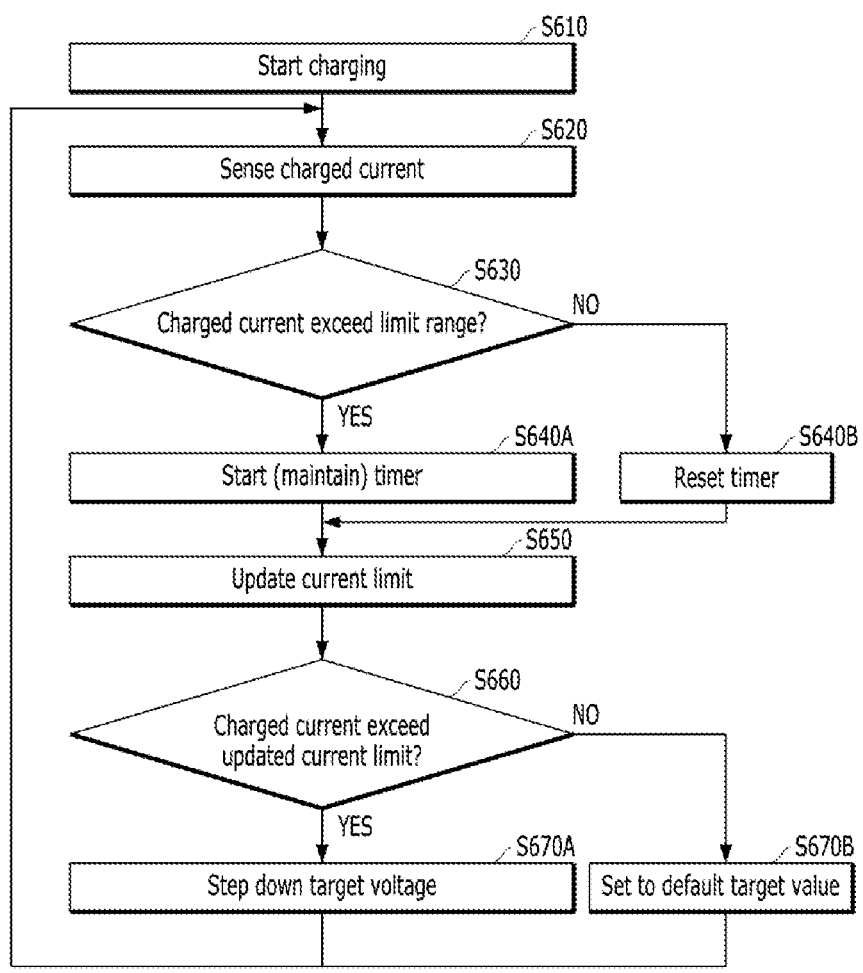
FIG. 6 is a flowchart illustrating a process of controlling an output voltage of a low voltage DC-DC converter (LDC) in the recharging system according to an embodiment of the present invention.

FIG. 6 is a flowchart illustrating a process of controlling the output voltage of the LDC in the recharging system according to an embodiment of the present invention.

Referring to FIG. 6, recharging of the supplementary battery is initiated under the control of the LDC controller (S610). The supplementary battery sensor periodically senses charged current (S620) and the LDC controller determines whether the charged current exceeds a limit range (i.e. a value obtained by subtracting a band value from a current limit) (S630). When the charged current exceeds the limit range, the timer is started (S640A). The timer value is continuously accumulated when the timer has been started, and the timer is set to 0 when the charged current does not reach the limit range (S640B).

Subsequently, the LDC controller updates the current limit using an SOC value of the supplementary battery on the basis of the timer value, BTM and setting (S650) and determines whether charged current exceeds the current limit (S660). The LDC controller reduces the LDC target voltage by one step when the charged current exceeds the current limit (S670A) and sets the LDC target voltage to a reference (default) target voltage otherwise (S670B).

The present invention may be implemented as code that can be written to a computer-readable recording medium and can thus be read by a computer. The computer-readable recording medium may be any type of recording device in which data can be stored in a computer-readable manner. Examples of the computer-readable recording medium include an HDD (Hard Disk Drive), an SSD (Solid State Drive), SDD (Silicon Disc Drive), a ROM, a RAM, a CD-ROM, a magnetic tape, a floppy disk, optical data storage, and a carrier wave (e.g., data transmission over the Internet).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a supplementary battery recharging system for a vehicle, comprising the steps of:
    acquiring charged current of the supplementary battery;
    starting a timer when the charged current exceeds a limit range;
    updating a current limit on the basis of a timer value and temperature information of the supplementary battery; and
    controlling a target voltage using the updated current limit.

2. The method according to claim 1, wherein the limit range is acquired by subtracting a predetermined band value from the current limit.

3. The method according to claim 1, further comprising the step of:
    resetting the timer when the charged current is lower than the limit range.

4. The method according to claim 1, wherein the step of updating the current limit is performed with reference to a predetermined table.

5. The method according to claim 4, wherein a plurality of tables is provided according to state of charge (SOC) of the supplementary battery.

6. The method according to claim 1, wherein the step of starting the timer comprises maintaining operation of the timer when the timer has been started.

7. The method according to claim 1, wherein the step of controlling the target voltage comprises stepping down the target voltage when the charged current exceeds the updated current limit.

8. The method according to claim 1, wherein the step of controlling the target voltage comprises adjusting the target voltage to a default target voltage when the charged current is lower than the updated current limit.

9. The method according to claim 1, wherein each of the steps is repeated at a predetermined interval.

10. A non-transitory computer readable medium containing program instructions executed by a processor, the computer readable medium comprising:
    program instructions that acquire charged current of a supplementary battery;
    program instructions that start a timer when the charged current exceeds a limit range;
    program instructions that update a current limit on the basis of a timer value and temperature information of the supplementary battery; and
    program instructions that control a target voltage using the updated current limit.

11. A supplementary battery recharging system for a vehicle, comprising:
    a supplementary battery;
    a low voltage DC-DC converter (LDC) for charging the supplementary battery with power of a main battery;
    a supplementary battery sensor for acquiring state information of the supplementary battery; and
    an LDC controller for acquiring charged current from the supplementary battery, starting a timer when the charged current exceeds a limit range, updating a current limit on the basis of a timer value and temperature information of the supplementary battery acquired from the supplementary battery sensor, and controlling a target voltage of the LDC using the updated current limit.

12. The supplementary battery recharging system according to claim 11, wherein the limit range is acquired by subtracting a predetermined band value from the current limit.

13. The supplementary battery recharging system according to claim 11, wherein the LDC controller resets the timer when the charged current is lower than the limit range.

14. The supplementary battery recharging system according to claim 11, wherein the LDC controller updates the current limit with reference to a predetermined table.

15. The supplementary battery recharging system according to claim 14, wherein a plurality of tables is provided according to SOC of the supplementary battery.

16. The supplementary battery recharging system according to claim 11, wherein the LDC controller maintains operation of the timer when the timer has been started and the charged current exceeds the limit range.

17. The supplementary battery recharging system according to claim 11, wherein the LDC controller steps down the target voltage when the charged current exceeds the updated current limit.

18. The supplementary battery recharging system according to claim 11, wherein the LDC controller adjusts the target voltage to a default target voltage when the charged current is lower than the updated current limit.

19. The supplementary battery recharging system according to claim 11, wherein acquisition of the charged current, comparison of the charged current with the limit range, update of the current limit, and control of the target voltage of the LDC are repeated at a predetermined interval.

* * * * *